US006257896B1

(12) United States Patent
Fargano

(10) Patent No.: US 6,257,896 B1
(45) Date of Patent: Jul. 10, 2001

(54) SKILLS BUILDING METHOD AND SYSTEM

(75) Inventor: Michael J. Fargano, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/437,019

(22) Filed: Nov. 9, 1999

(51) Int. Cl.[7] .................................................. G09B 7/00
(52) U.S. Cl. ...................................... 434/322; 340/286.02
(58) Field of Search ..................................... 434/322, 323, 434/350, 236, 353, 307 A, 307 R; 340/286.02

(56) References Cited

U.S. PATENT DOCUMENTS

| 4,593,904 | * | 6/1986 | Graves .................................. 273/1 E |
| 5,259,766 | * | 11/1993 | Sack et al. ............................ 434/362 |
| 5,318,450 | * | 6/1994 | Carver ................................... 434/336 |
| 5,437,555 | * | 8/1995 | Ziv-El .................................. 434/336 |
| 5,899,699 | * | 5/1999 | Kamiya ............................. 434/307 A |
| 5,942,969 | * | 8/1999 | Wicks .............................. 340/286.02 |
| 6,078,815 | * | 6/2000 | Edwards ............................... 455/450 |
| 6,102,406 | * | 8/2000 | Miles et al. ........................... 273/430 |

\* cited by examiner

Primary Examiner—Joe H. Cheng
Assistant Examiner—Kathleen M Christman
(74) Attorney, Agent, or Firm—Brooks & Kushman P.C.

(57) ABSTRACT

A skills building method and system for training a subject utilize an accumulated score based on a series of graded responses, over a period of time, to a series of challenges sent over various telecommunications channels to the subject. In the method, a telecommunications channel is selected from a plurality of telecommunications channels that are available for communicating with the subject. A challenge is autonomously sent over the selected telecommunications channel to the subject. A response is received from the subject, the response is graded, and a score is accumulated.

27 Claims, 3 Drawing Sheets

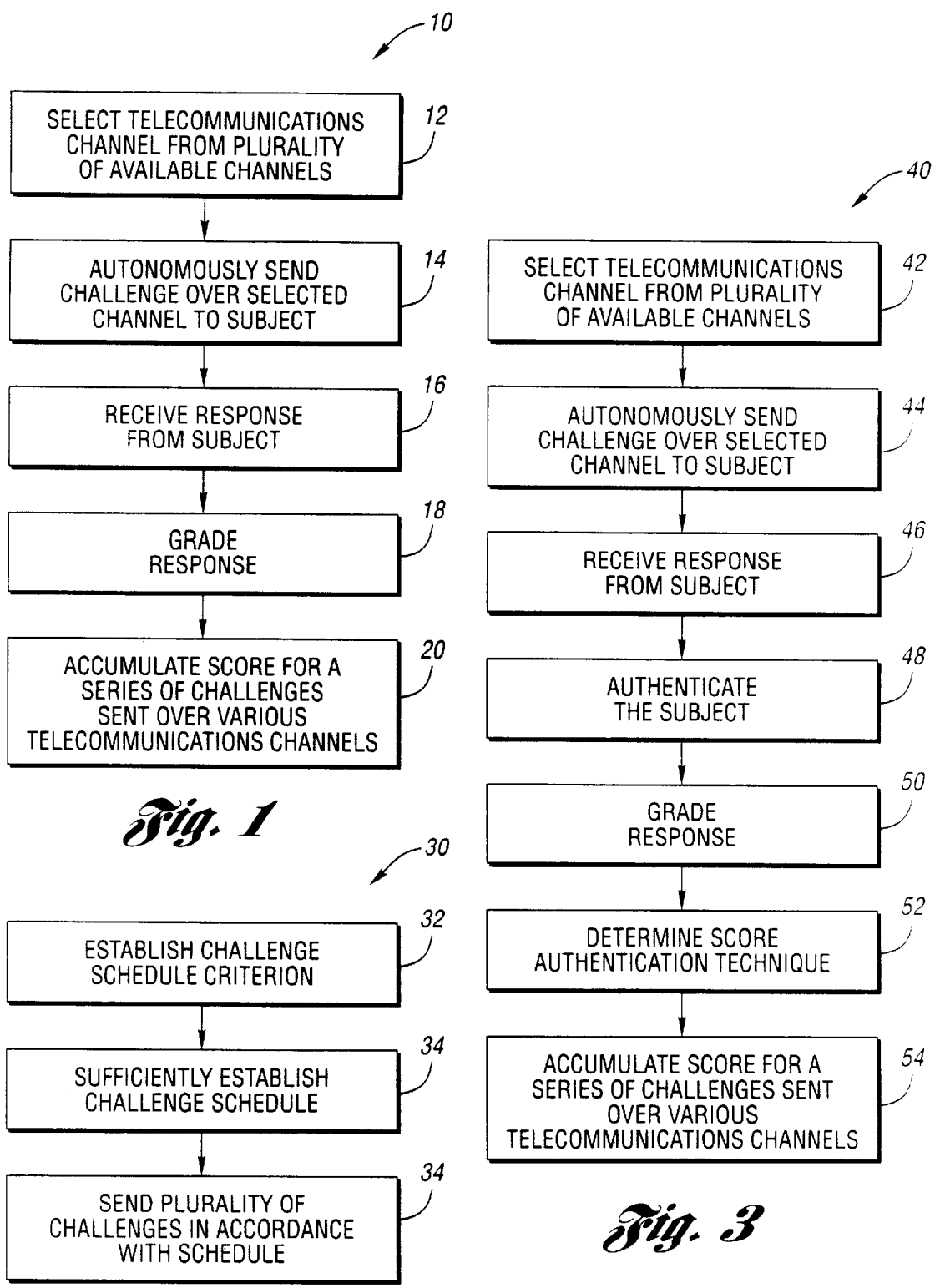

SKILLS BUILDING METHOD AND SYSTEM

TECHNICAL FIELD

The present invention relates to a skills building method for training a subject, and a skills building system.

BACKGROUND ART

In the employer/employee environment, many times it is desirable for the employee to receive continuing training and education. Traditionally, continuing training and skill building are achieved with seminars, classroom lectures, homework, and tests. Unfortunately, the traditional continuing education techniques require a substantial amount of employee time, and thus, are usually limited to a short duration to avoid overburdening the employee. For example, a three day seminar and a six week evening class are two examples of short duration training that require substantial employee time during that duration. For the foregoing reasons, there is a need for an ongoing skill building method and system that is implemented in such a way that the training subject is not overburdened by the ongoing training process.

DISCLOSURE OF INVENTION

It is, therefore, an object of the present invention to provide a skills building method and system for training a subject that autonomously sends challenges over various telecommunications channels and accumulates a score based on a series of graded responses to a series of challenges.

In carrying out the above object, a skills building method for training a subject is provided. The method comprises selecting a telecommunications channel from a plurality of telecommunications channels that are available for communicating with the subject, and autonomously sending a challenge over the selected telecommunications channel to the subject. The method further comprises receiving a response from the subject, grading the response, and accumulating a score for the subject based on the graded response. The accumulated score, over a period of time, is based on a series of graded responses to a series of challenges sent over various telecommunications channels to the subject.

In one implementation, autonomously sending the challenge further comprises establishing a challenge schedule not fully known to the subject, and sending the plurality of challenges to the subject, over a plurality of different telecommunications channels, in accordance with the established schedule. The schedule may be firmly established, or may be sufficiently established by establishing at least one challenge schedule criterion. After the at least one criterion is established, the challenge schedule may be sufficiently established such that the challenged schedule, once fully realized, meets the at least one challenge schedule criterion.

In the embodiments of the present invention, it is appreciated that the telecommunications channel is selected from a plurality of telecommunications channels available for communicating with the subject, for each autonomously sent challenge. The plurality of telecommunications channels may include a number of different channels. For example, a channel may extend over a wireline access network, possibly to a telephone. Further, for example, the channel may extend over a wireless access network, potentially to a wireless device such as a phone or pager. Still further, for example, channels may extend over circuit switched networks and packet or cell switched networks. Further, for example, a particular channel may be made up of a number of different portions having different types of communication taking place at different portions of the overall path. Still further, the channels may include voice channels or data channels. And even further, it is to be appreciated that the challenge may be autonomously sent in a variety of formats, such as an interactive challenge, or a message challenge (for example, an e-mail message or a voice mail message to which the subject is to reply).

Even further, the challenge need not be entirely integrated in the initial communication over the selected telecommunications channel. That is, the autonomously sent challenge may be in the form of an instruction. The instruction directs the subject to a different location to complete the challenge. For example, the instruction could direct the subject to an Internet site. The instruction may be a Hyper Text Markup Language (HTML) link to a web site. In another example, the instruction could be a telephone number for the subject to call.

A preferred embodiment further comprises authenticating the subject. Authentication may take a number of different forms, and may occur at different times, as appropriate for the particular implementation of the present invention. For example, the subject may be authenticated prior to sending the challenge, prior to accepting a response from the subject, or after receiving a response. Further, authenticating may include comparing a personal password provided by the subject to a registered password for the subject. Alternatively, authenticating may include comparing digital identification provided by the subject to a registered digital signature for the subject. For example, the digital identification may be in the form of a certificate, or any other appropriate form.

A preferred method further comprises determining a score accumulation technique. Embodiments of the present invention may use different score accumulation techniques or combine a number of different score accumulation techniques to form yet another score accumulation technique. For example, the score accumulation technique may be determined as a difficulty based technique wherein accumulating the score is further based on a difficulty rating for the challenge. The difficulty rating for the challenge may be selected by the subject prior to the challenge being presented, or the system may determine the appropriate difficulty rating. For example, an adaptive testing technique may be used or difficulty rating may be randomly determined each time a question is sent. In another example, the score accumulation technique is determined as a betting based technique wherein accumulating the score is further based on a bet placed by the subject of the challenge.

Even further, in carrying out the present invention, a computer readable storage medium is provided. The computer readable storage medium includes instructions represented by information stored on the medium. The instructions are executable by a computer to perform a skills building method for training a subject. The computer readable storage medium further comprises instructions for selecting a telecommunications channel from a plurality of telecommunications channels that are available for communicating with the subject, and instructions for autonomously sending a challenge over the selected telecommunications channel to the subject. The computer readable storage medium further comprises instructions for receiving a response from the subject, instructions for grading the response, and instructions for accumulating a score for the subject based on the graded response. Over a period of time, the accumulated score is based on a series of graded responses to a series of challenges sent over various telecommunications channels to the subject.

Yet further, in carrying out the present invention, a skills building system for training a subject is provided. This system comprises control logic configured to select a telecommunications channel from a plurality of telecommunications channels that are available for communicating with the subject, and control logic configured to autonomously send a challenge over the selected telecommunications channel to the subject, and to receive a response from the subject. The system further comprises control logic configured to grade a response, and to accumulate a score for the subject based on the graded response. Over a period of time, the accumulated score is based on a series of graded responses to a series of challenges sent over various telecommunications channels to the subject.

The advantages associated with embodiments of the present invention are numerous. For example, embodiments of the present invention provide an ongoing skills building architecture, system, and method. In an ongoing, continuing, skill building exercise, challenges are sent to the subject over different telecommunications channels, with the responses being graded in a score that accumulates over time. Because the present invention may reach the subject in many different ways using different telecommunications channels, each individual challenge may advantageously be a short, quick challenge that is answered on the spot or in a short amount of time. For example, a subject may receive an e-mail challenge with a time limit for replying to the challenge.

On the other hand, the subject may receive an automated telephone call challenge. In accordance with the present invention, the skills building exercises may take place as short time duration challenges spread out over a long period of time, so that the subject is not burdened by the training, but still benefits from the exercises. In contrast, existing skill building techniques generally require the subject to spend an extended period of time at each sitting. In accordance with the present invention, short, quick challenges are spread out over time so that a score can be accumulated, with the subject being reached at different locations by using various telecommunications channels.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a block diagram illustrating a skills building method of the present invention;

FIG. 2 is a block diagram illustrating the establishment of a challenge schedule;

FIG. 3 is a block diagram illustrating another embodiment of the resent invention, using authentication and using a score accumulation technique;

BEST MODE FOR CARRYING OUT THE INVENTION

Figure 4:
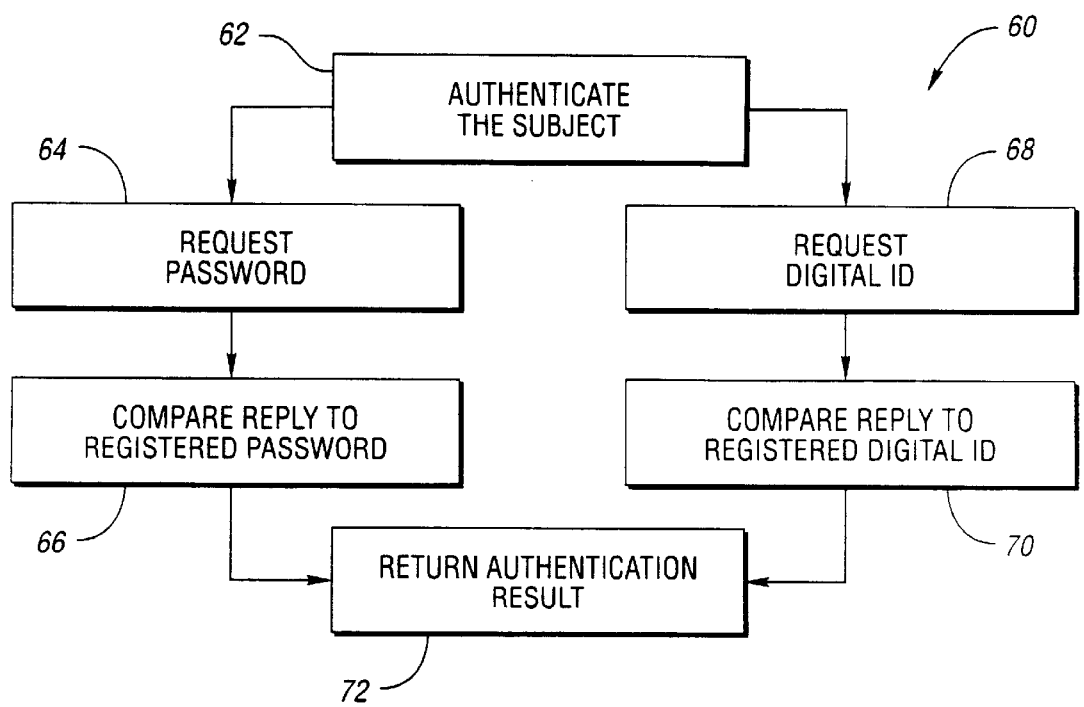
FIG. 4 is a block diagram illustrating authentication examples.

With reference to FIG. 1, a block diagram illustrating an embodiment of the present invention is generally indicated at 10. At block 12, a telecommunications channel is selected from a plurality of telecommunications channels that are available for communicating with the subject. The subject is the one whose skills are to be improved with the skills building exercises. There may be many subjects. For example, all employees of a company may be subjects in an implementation of the skills building method of the present invention for that company. For a particular subject or person, there may be many telecommunications channels that are available for communicating with that subject.

For example, the particular subject may have e-mail, voice mail, a cellular phone, a pager, or any other communication device. The particular communication channel that is selected may be selected because it is well suited for the particular challenge being sent, or because it is known to be the most convenient channel for the subject at the particular time the challenge is being sent. For example, challenges sent during the day may be sent to e-mail or voice mail, while challenges in the evening may be sent to a pager. Further, embodiments of the present invention may be implemented such that several different telecommunications channels are used in successive attempts to reach the subject. For example, if a phone call goes unanswered, email could be sent to the subject.

After the telecommunications channel is selected, based on any of a number of different criteria, a challenge is autonomously sent over the selected channel to the subject at block 14. In accordance with the present invention, the challenge is sent autonomously. This means that the subject must always be ready for challenges, because one may arrive at any time. At block 16, a response is received from the subject. Preferably, in addition to the challenge being autonomously sent, the subject is given a time limit to respond to the challenge. The time limit should be sufficiently small to prevent the subject from cheating to obtain the correct response.

At block 18, the response is graded. At block 20, the score is accumulated for the subject based on the graded response. Over a period of time, the accumulated score is based on a series of graded responses to a series of challenges sent over various telecommunications channels to the subject. That is, as time goes by, the subject is repeatedly sent challenges. Responses to the repeated challenges are graded, and some form of accumulation is used to keep an overall score for the subject. In accordance with the present invention, the repeated challenges are sent over a number of different telecommunications channels, as appropriate, depending on the particular challenge and possibly other factors.

In present invention, for the first time, a skills building method for training a subject utilizes autonomously sent challenges over various telecommunication channels, and an accumulated score that, over a period of time, reflects responses from the subject to a series of challenges sent over various different channels. For example, in an ongoing education process, having no particular time limit for the training (but probably having time limits for the challenges), a subject may be faced with autonomously sent challenges over various communication channels. Such an implementation provides continuing education for the subject, without inducing significant burden to the subject.

With reference to FIG. 2, in an embodiment of the present invention that utilizes a challenge schedule, a method of establishing a challenge schedule is generally indicated at 30. At block 32, at least one challenge schedule criterion is established. At block 34, the challenge schedule is sufficiently established such that, once fully realized, the schedule meets the at least one challenge schedule criteria. That is, depending on the criteria to be met by the schedule, it may not be necessary to firmly establish a fixed schedule. On the other hand, it may be necessary to lay out some guidelines (criteria) for the sending of challenges, while leaving the significant details, such as the particular times and channels when a challenge is sent to be determined on the fly. That is, in one extreme case, the challenges may have no schedule and be randomly sent to random subjects over random communications channels. On the other extreme, the challenge schedule may be predetermined and precisely followed. In between these two extremes, criteria may be established, with the schedule being sufficiently established so that the criteria are met, however, the schedule need not be completely and rigidly defined ahead of time. For example, each day may have a list of subjects to be challenged, but the communication channel and challenge to be sent, as well as the time for sending, may be a random time during the day.

With reference to FIG. 3, another embodiment of the present invention is generally indicated at 40. At block 42, the telecommunications channel is selected from a plurality of available channels. At block 44, a challenge is autonomously sent over the select channel to the subject. At block 46, a response is received from the subject. At block 48, the subject is authenticated. The response is graded at block 50, and a score accumulation technique is determined at block 52. At block 54, a score is accumulated for a series of challenges sent over various telecommunications channels. Of course, it is appreciated that the authentication and the score accumulation technique may take many different forms.

In FIG. 4, exemplary authentication techniques are generally indicated at 60. At block 62, subject authentication is initiated. One implementation may request a password (block 64), and compare the password to a registered password (block 66). If the passwords match, the subject is considered authenticated. This technique would be similar to the entering of a personal identification number when performing telephone banking. On the other hand, a digital identification may be requested, as at block 68. At block 70, a digital identification received as a reply is compared to a registered digital identification. If the digital identifications match, the subject is considered authenticated. The digital identification may take a number of different forms. For example, a certificate may be used as a digital identification. At block 72, the authentication sequence has ended and the challenge continues, if the subject was properly authenticated. Otherwise, the accumulated score of the subject is not modified because it is not certain whether the one receiving the challenge is actually the desired subject. Of course, any suitable authentication technique may be used in the alternative.

Figure 5:
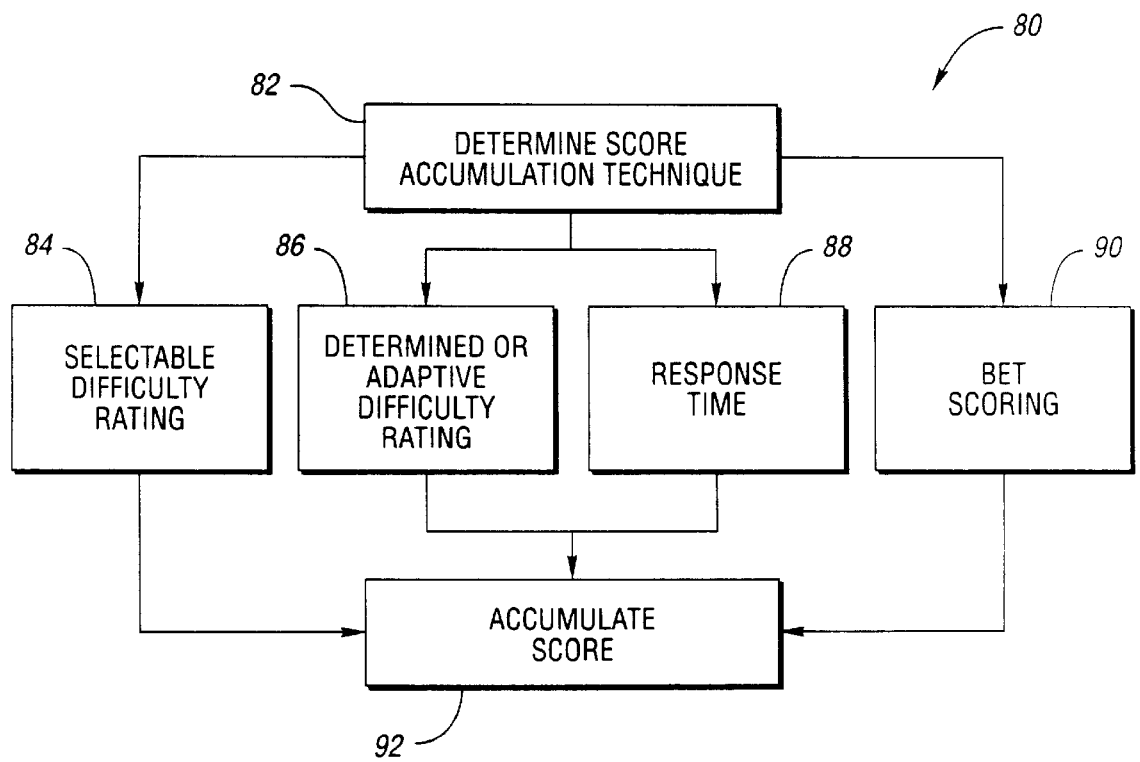
FIG. 5 is a block diagram illustrating score accumulation technique examples.

In FIG. 5, exemplary techniques for accumulating scores are generally indicated at 80. At block 82, the score accumulation technique determining process is initiated. Although four examples are shown, it is appreciated that there are many ways to accumulate scores based on subject responses. In one example, at block 84, the score for an individual challenge is based on a selectable difficulty rating. That is, the subject is contacted, and is allowed to select a difficulty level. Thereafter, a challenge of that difficulty level is sent to the subject. A correct (or incorrect) answer results in an appropriate adjustment in the score accumulator. In another example, at block 86, difficulty ratings of the challenges may be determined without the subject's input. For example, an adaptive technique may be used wherein correct responses result in increasingly difficult challenges, while incorrect responses result in relatively easier challenges being presented in succession.

In yet another example for score accumulation, at block 88, the scoring for a particular challenge is based on response time for the subject. That is, a fast correct response would have a better effect on an accumulated score than a slow correct response, and an incorrect response would have an even worse effect on the score for the subject. Further, in another example, at block 90, bet scoring may be utilized. That is, the subject may wager a portion of their existing score on a particular challenge. In one implementation, bet scoring is combined with flexible difficulty challenges so that tougher questions may be given a better payout rate than relatively easy questions. At block 92, the overall accumulated score that has been accumulated from a series of challenges is adjusted based on the results of the particular challenge at hand.

Figure 6:
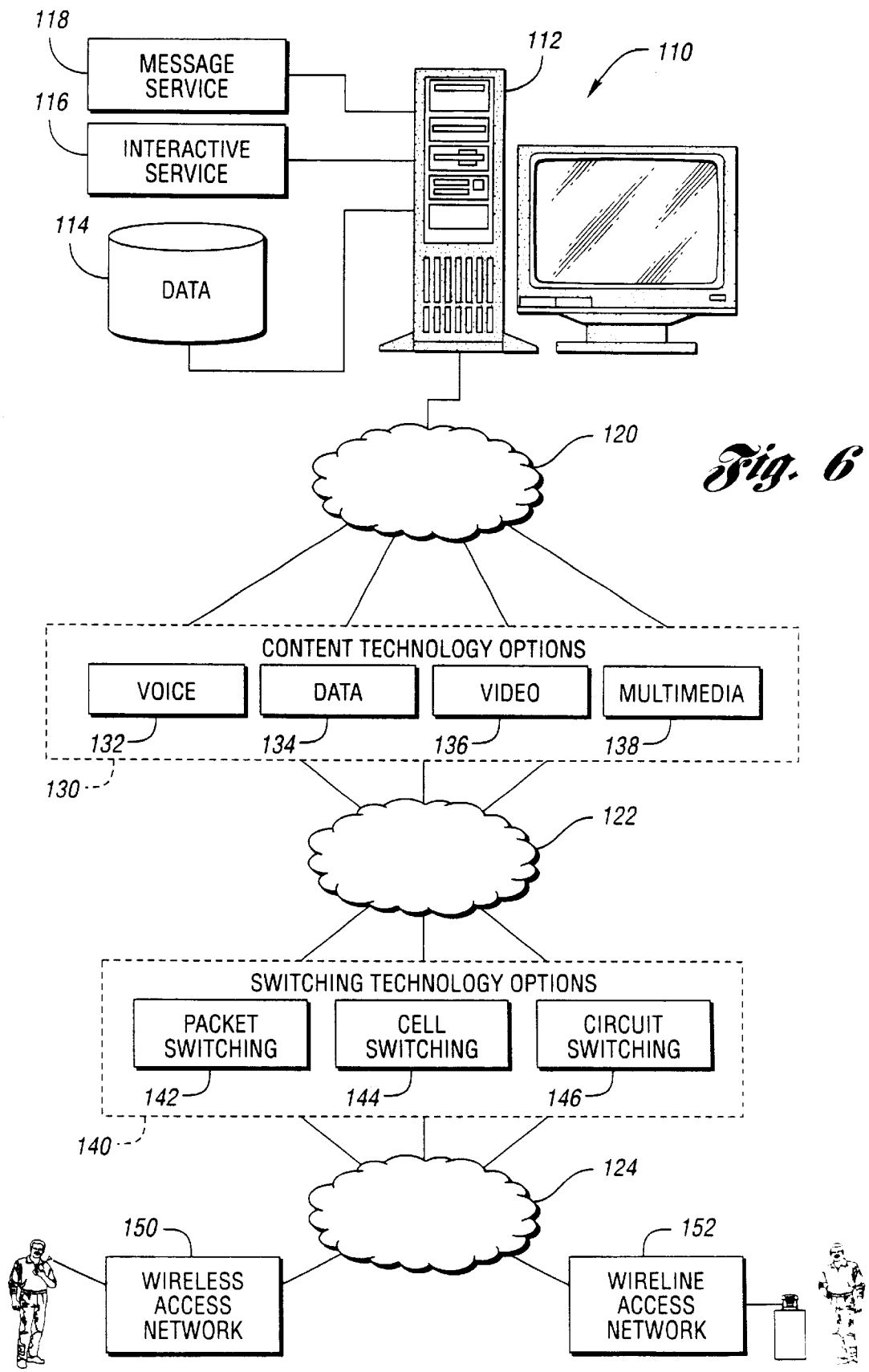
FIG. 6 is a system of the present invention using control logic to conduct a skills building exercise.

With reference to FIG. 6, a system of the present invention is generally indicated at 110. Although many implementations are possible, in this implementation, a server 112 functions as control logic to perform a skills building exercise in accordance with the present invention. A challenge database 114 is one source of challenges for server 112. Of course, there may be other sources for challenges, such as manual creation of challenges by a supervisor, or selection of a challenge submitted by a different subject for presentation to other subjects. As alluded to previously, the challenges may take place as an interactive service (block 116) or as a message service (block 118), or combinations of these. For example, challenges may be sent using voice messaging or e-mail messaging. Further, challenges may be sent as an interactive event, such as in a telephone call.

With continuing reference to FIG. 6, server 112 connects to a network with various portions being indicated by clouds 120, 122, 124. In accordance with the present invention, the telecommunications channel for the challenge is selected from a plurality of telecommunications channels that are available for communicating with the subject. That is, selecting the telecommunications channel to reach the subject out of the available channels for communicating with the subject means selecting the particular way that the subject receives the challenge, for example, a telephone call, a page, an email, etc. As such, many different communication schemes may be utilized between server 112 and the subject.

It is appreciated that the content sent to the subject may take a variety of different forms as illustrated by content technology options block 130. For example, voice content (block 132), data content (block 134), video content (block 136), multimedia content (block 138) are all examples of content types for the challenge. Of course, the content technology options indicated at 130 are exemplary only, and other content types may be appropriate for challenges. In embodiments of the present invention, not only are there various content technology options as indicated at block 130, there are various switching technology options as indicated at block 140. That is, for example, packet switching (block 142), cell switching (block 144), and circuit switching (block 146), are examples of different switching technology that may be used for sending the challenge to the subject. Further, it is appreciated that the path from the server to the subject need not utilize any single switching technology option for the entire path length, and various types of switching may be used along different portions of the communications path.

Further, in addition to having various content technology options and various switching technology options, embodiments of the present invention support various access technology options. As an example, a wireless access network (block 150) and a wireline access network (block 152) are illustrated. Similarly, as with the other technology options provided by embodiments of the present invention, the access technology options may have many variations, and different access technology options may be integrated together for a particular challenge. For example, a challenge may be sent using wireless access, such as a challenge sent to a pager, with the response to the challenge being sent over the wireline access network, such as with a telephone.

In addition to the variations described above, yet another example of a way to provide additional flexibility with embodiments of the present invention is to autonomously send the challenge as an instruction. That is, in some embodiments of the present invention, a challenge may be sent as an instruction over the selected telecommunication channel to the subject. The instruction directs the subject to a different location to complete the challenge. For example, the instruction could direct the subject to an Internet site. In another example, the instruction could be a phone number (directing the subject to call the number). That is, the term "autonomously sending a challenge" as used herein means sending a challenge, wherein the challenge is not rigidly defined. That is, the challenge may be a completely defined challenge with the subject only needing to respond, as directed, with an answer. On the other hand, a challenge may be an instruction, indicating to the subject that this is a challenge and you should go to the location specified in this challenge, to receive the question and answer it.

In an example, the term "autonomously sending a challenge" may be extended to mean autonomously sending a challenge as an instruction. The instruction could direct the subject to a location where a question is located, and the location where the question is located could instruct the subject as to how the answer should be sent. For example, the challenge could be autonomously sent as a page to the subject, indicating a telephone number to call. The challenge, sent as an instruction, tells the subject to call the number. Upon calling the number, the subject receives a question and in some embodiments could be required to answer the question then. In other embodiments, in addition to receiving the question, the subject could receive (for example) a different location to go to to submit a response (for example, a web site). In light of the examples given immediately above, it is appreciated that the term "autonomously sending a challenge" may be interpreted to encompass a variety of different ways of initiating a challenge, with the challenge possibly involving multiple locations.

Embodiments of the present invention, for the very first time, provide a way for an entity (for example, a company) to provide an alternative to traditional training via a telecommunications network where a question in the form of a challenge is sent to a subject and the subject's response is graded and an accumulated score is kept. Because of the accumulated nature of the scores of the subjects, incentive systems may be appropriate in implementations of the invention. For example, prizes could be given (or purchased with) accumulated scores of the subjects. Further, in an alternative embodiment, a subject may submit a challenge to one or more other subjects and the challenge submitting subject's score is adjusted based on the responses of the other subjects to the submitted challenge. That is, the challenges and the scoring may be implemented in a number of different ways. Further, the present invention advantageously utilizes a plurality of telecommunications channels to reach the subjects in a plurality of different ways. A simple challenge/response implementation may be suitable for many applications, however, a more glitzy form may be used as desired.

In accordance with the present invention, easy continuous skills development may be obtained. In one particular implementation, the inventor contemplates an embodiment to support the skills development of wireless customer care agents.

In accordance with the present invention, a challenge system generates an autonomous challenge for the subject (based on criteria, a challenge database, another subject's challenge, etc.) and communicates it to the subject via a channel over telecommunications network (voice, data, multimedia, wireline, wireless, optical, cable, etc.). Correct and incorrect answers contribute to an accumulated score for the subject. As needed, security may be provided such as, for example, the authentication techniques described previously.

And further, it is to be appreciated that in an implementation of a system of the present invention, an administrator or an administrative system could manage the overall system: configuration management (for example, accumulation periods), fault management (for example, exceptions to normal behavior), performance management (for example, performance measurements and analysis), security management (for example, security administration), and accounting management (for example, billing).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A skills building method for training a subject, the method comprising:

selecting a telecommunications channel from a plurality of telecommunications channels that are available for communicating with the subject;

autonomously sending a challenge over the selected telecommunications channel to the subject;

receiving a response from the subject;

grading the response; and accumulating a score for the subject based on the graded response, wherein, over a period of time, the accumulated score is based on a series of graded responses to a series of challenges sent over various telecommunications channels to the subject.

2. The method of claim 1 wherein autonomously sending further comprises:

establishing a challenge schedule, not fully known to the subject, for sending a plurality of challenges to the subject; and sending the plurality of challenges to the subject, over a plurality of different telecommunications channels, in accordance with the established schedule.

3. The method of claim 2 wherein establishing the challenge schedule further comprises:

establishing at least one challenge schedule criterion for sending the plurality of challenges to the subject; and sufficiently establishing the challenge schedule such that the challenge schedule, once fully realized, meets the at least one challenge schedule criterion.

4. The method of claim 1 wherein selecting the telecommunications channel further comprises:

determining the plurality of telecommunications channels that are available for communication with the subject, wherein the plurality includes at least one channel extending over a wireless access network.

5. The method of claim 1 wherein selecting the telecommunications channel further comprises:

determining the plurality of telecommunications channels that are available for communication with the subject, wherein the plurality includes at least one channel extending over a wireline access network.

6. The method of claim 1 wherein selecting the telecommunications channel further comprises:

determining the plurality of telecommunications channels that are available for communication with the subject, wherein the plurality includes at least one channel extending over a circuit switched network.

7. The method of claim 1 wherein selecting the telecommunications channel further comprises:

determining the plurality of telecommunications channels that are available for communication with the subject, wherein the plurality includes at least one channel extending over a packet switched network.

8. The method of claim 1 wherein selecting the telecommunications channel further comprises:

determining the plurality of telecommunications channels that are available for communication with the subject, wherein the plurality includes at least one voice channel.

9. The method of claim 1 wherein selecting the telecommunications channel further comprises:

determining the plurality of telecommunications channels that are available for communication with the subject, wherein the plurality includes at least one data channel.

10. The method of claim 1 wherein autonomously sending the challenge further comprises:

autonomously sending the challenge as a message.

11. The method of claim 10 wherein the message is an email message.

12. The method of claim 10 wherein the message is a voicemail message.

13. The method of claim 1 further comprising:

authenticating the subject.

14. The method of claim 13 wherein authenticating further comprises:

authenticating the subject prior to receiving the response.

15. The method of claim 13 wherein authenticating further comprises:

comparing a personal password provided by the subject to a registered personal password for the subject.

16. The method of claim 13 wherein authenticating further comprises:

comparing a digital identification provided by the subject to a registered signature for the subject.

17. The method of claim 1 further comprising:

determining a score accumulation technique.

18. The method of claim 17 wherein determining the score accumulation technique further comprises:

determining the score accumulation technique as a difficulty based technique wherein accumulating the score is further based on a difficulty rating for the challenge.

19. The method of claim 18 wherein autonomously sending the challenge further comprises:

requesting that the subject select the difficulty rating for the challenge; and autonomously sending the challenge, the challenge having the selected difficulty rating.

20. The method of claim 18 wherein autonomously sending the challenge further comprises:

determining the difficulty rating for the challenge utilizing an adaptive testing technique such that difficulty rating is based on past performance by the subject; and autonomously sending the challenge, the challenge having the determined difficulty rating.

21. The method of claim 17 wherein determining the score accumulation technique further comprises:

determining the score accumulation technique as a response time based technique wherein accumulating the score is further based on a response time to the challenge for the subject.

22. The method of claim 17 wherein determining the score accumulation technique further comprises:

determining the score accumulation technique as a betting based technique wherein accumulating the score is further based on a bet placed by the subject of the challenge.

23. The method of claim 1 wherein autonomously sending the challenge further comprises:

sending an instruction over the selected telecommunications channel to the subject, the instruction directing the subject to a different location to complete the challenge.

24. The method of claim 23 wherein the instruction directs the subject to an Internet site.

25. The method of claim 23 wherein the instruction is a phone number.

26. A computer readable storage medium including instructions represented by information stored on the medium, the instructions being executable by a computer to perform a skills building method for training a subject, the computer readable storage medium further comprising:

instructions for selecting a telecommunications channel from a plurality of telecommunications channels that are available for communicating with the subject;

instructions for autonomously sending a challenge over the selected telecommunications channel to the subject;

instructions for receiving a response from the subject;

instructions for grading the response; and instructions for accumulating a score for the subject based on the graded response, wherein, over a period of time, the accumulated score is based on a series of graded responses to a series of challenges sent over various telecommunications channels to the subject.

27. A skills building system for training a subject, the system comprising:

control logic configured to select a telecommunications channel from a plurality of telecommunications channels that are available for communicating with the subject;

control logic configured to autonomously send a challenge over the selected telecommunications channel to the subject, and to receive a response from the subject; and control logic configured to grade the response, and to accumulate a score for the subject based on the graded response, wherein, over a period of time, the accumulated score is based on a series of graded responses to a series of challenges sent over various telecommunications channels to the subject.

* * * * *